Figure 10:
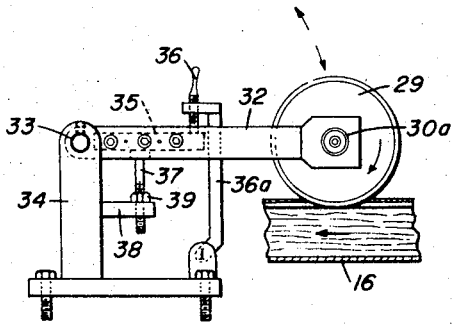
Figure 1:
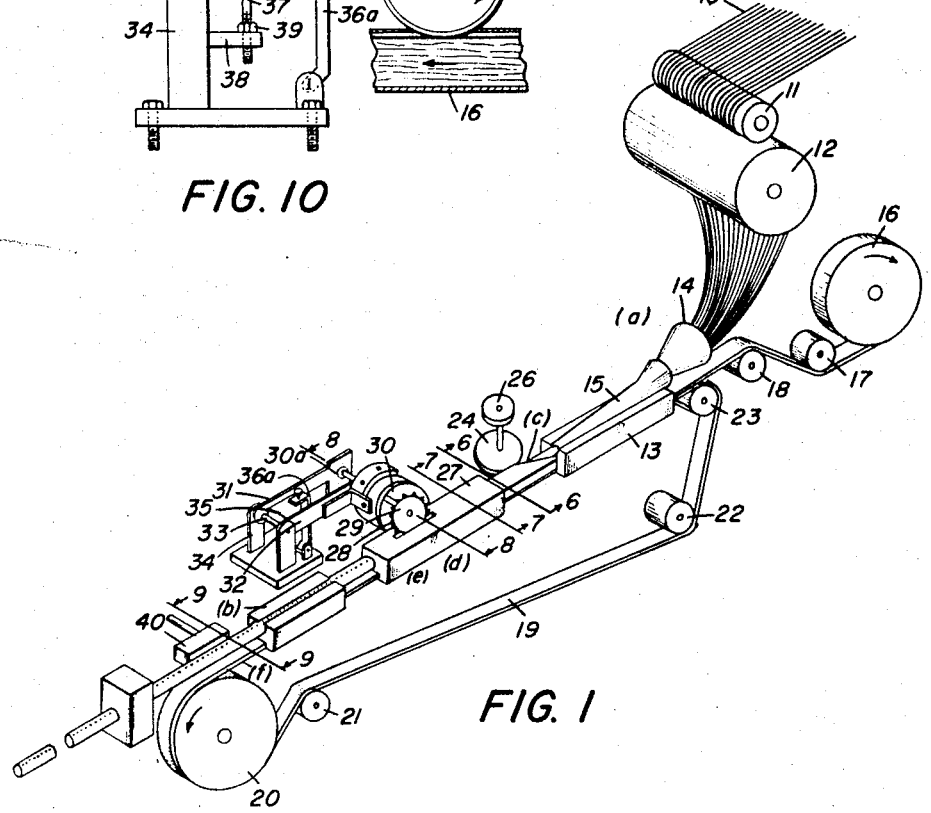
Figure 2:
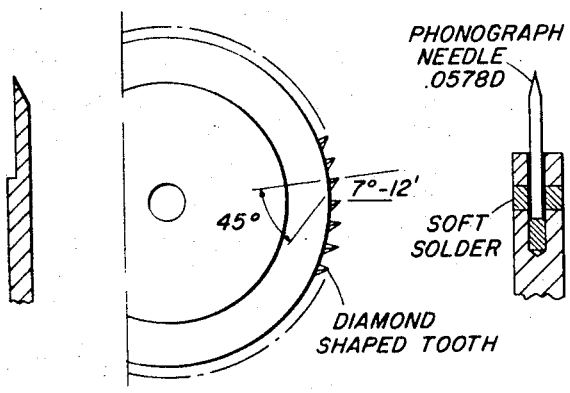
Figure 3:
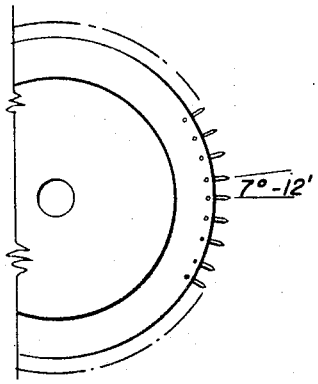
Figure 4:
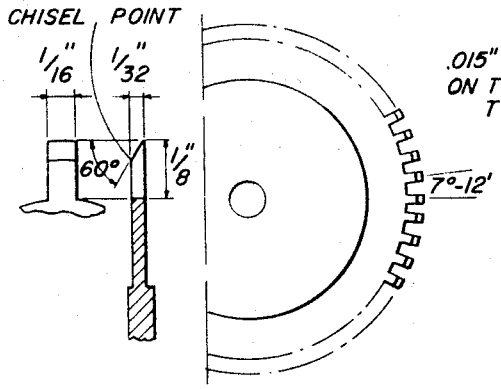
Figure 5:
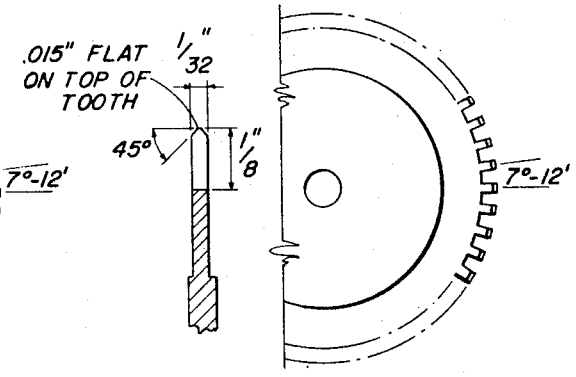
Figure 7:
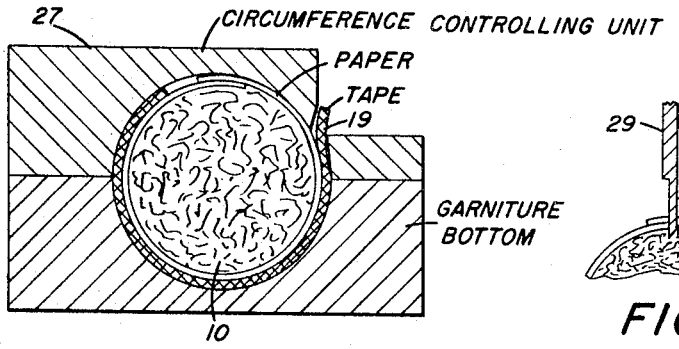
Figure 8:
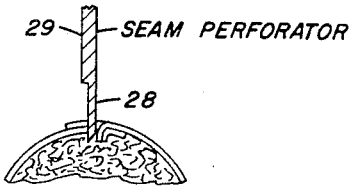
Figure 6:
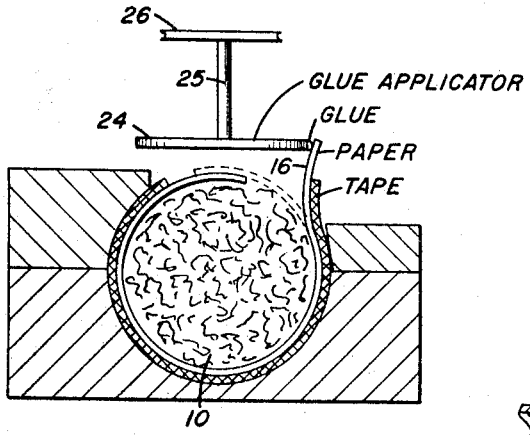
Figure 9:
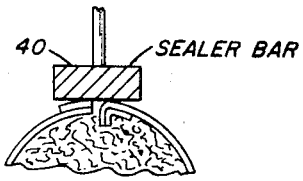
Figure 11:
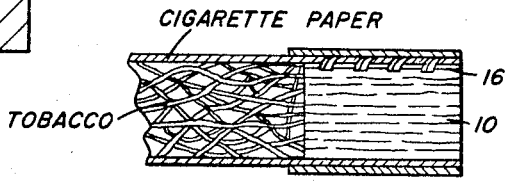
Figure 12:
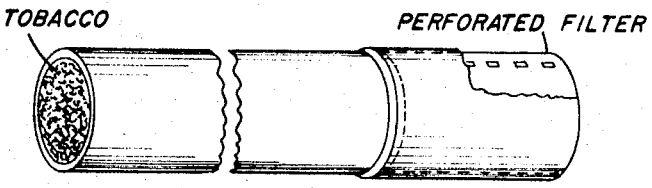

T861014

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 367

660,847

FILTER CIGARETTE ASSEMBLY HAVING ITS PAPER OVERWRAP MECHANICALLY LOCKED IN PLACE

Albert H. Agett and Paul Gallagher, Kingsport, Tenn., assignors to Eastman Kodak Company, Rochester, N.Y., a corporation of New Jersey

Original application Dec. 28, 1964, Ser. No. 421,276, now Patent No. 3,345,917, dated Oct. 10, 1967. Divided and this application June 9, 1967. Published Apr. 8, 1969

Class 131—10

3 Sheets Drawing. 22 Pages Specification

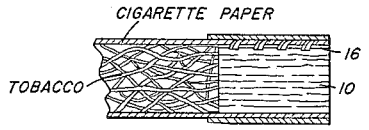

An improved paper wrapped filamentary cigarette and filter element having a substantially cylindrical mass of filamentary tobacco smoke filter material encased in a paper wrap, the latter having an overlapped seam in which the overlying and underlying portions are perforated to mechanically lock the paper against slippage.

SN - 660847 T861014

April 8, 1969 A. H. AGETT ET AL DEF. PUB.

FILTER CIGARETTE ASSEMBLY HAVING ITS PAPER OVERWRAP MECHANICALLY LOCKED IN PLACE

Original Filed Dec. 28, 1964 Sheet 1 of 3

ALBERT H. AGETT
PAUL GALLAGHER
INVENTORS

T861014

SN - 660847

April 8, 1969 A. H. AGETT ET AL DEF. PUB.

FILTER CIGARETTE ASSEMBLY HAVING ITS PAPER OVERWRAP MECHANICALLY LOCKED IN PLACE

Original Filed Dec. 28, 1964 Sheet 2 of 3

ALBERT H. AGETT
PAUL GALLAGHER
INVENTORS

BY

ATTORNEYS

ALBERT H. AGETT
PAUL GALLAGHER
INVENTORS

BY

ATTORNEYS